(12) United States Patent
Ishihara et al.

(10) Patent No.: US 7,549,069 B2
(45) Date of Patent: Jun. 16, 2009

(54) ESTIMATING SOFTWARE POWER CONSUMPTION

(75) Inventors: Toru Ishihara, Fukuoka (JP); Farzan Fallah, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 399 days.

(21) Appl. No.: 11/377,073

(22) Filed: Mar. 15, 2006

(65) Prior Publication Data
US 2007/0220292 A1 Sep. 20, 2007

(51) Int. Cl.
*G06F 1/32* (2006.01)
*G06F 9/455* (2006.01)

(52) U.S. Cl. .................. 713/320; 713/300; 713/310; 713/321; 703/13; 703/14; 703/22; 716/4; 716/5; 716/6

(58) Field of Classification Search .......... 713/300, 713/310, 320–324, 330, 340; 716/4, 5, 6; 703/13, 14, 22
See application file for complete search history.

(56) References Cited

U.S. PATENT DOCUMENTS

| | | | | |
|---|---|---|---|---|
| 5,521,834 | A | 5/1996 | Crafts et al. ............... | 364/489 |
| 5,838,947 | A | 11/1998 | Sarin ........................ | 395/500 |
| 6,002,878 | A | 12/1999 | Gehman et al. ............ | 713/340 |
| 6,021,381 | A | 2/2000 | Ohnishi ..................... | 702/60 |
| 6,151,568 | A | 11/2000 | Allen et al. ................ | 703/14 |
| 6,397,170 | B1 * | 5/2002 | Dean et al. ................ | 703/14 |
| 6,871,172 | B1 | 3/2005 | Sanders .................... | 703/14 |
| 6,895,561 | B2 | 5/2005 | Blatt et al. ................ | 716/1 |
| 7,000,204 | B2 | 2/2006 | McGuffin et al. .......... | 716/5 |
| 7,249,331 | B2 * | 7/2007 | Bose et al. ................ | 716/4 |
| 7,421,382 | B2 * | 9/2008 | Blatt et al. ................ | 703/13 |
| 2003/0110019 | A1 | 6/2003 | Blatt et al. ................ | 703/18 |
| 2003/0110020 | A1 | 6/2003 | Blatt et al. ................ | 703/18 |
| 2005/0008069 | A1 | 1/2005 | Cao .......................... | 375/224 |
| 2007/0198864 | A1 * | 8/2007 | Takase ...................... | 713/300 |

OTHER PUBLICATIONS

Tiwari V. et al., "Power Analysis of Embedded Software: A First Step Towards Software Power Minimization," IEEE Communications Magazine, vol. 2, No. 4, pp. 437-445, Dec. 1994.

EP search report, EP application No. 07005237.8-2224; 7 pages, May 31, 2007.

"Bansal, et al., Power Monitors: A Framework for System-Level Power Estimation Using Heterogeneous Power Models" (7 pages), 2005.

Chang, et al., "Cycle-Accurate Energy Consumption Measurement and Analysis: Case Study of ARM7TDMI" (pp. 185-190), 2000.

Flinn, et al., "PowerScope: A Tool for Profiling the Energy Usage of Mobile Applications" (9 pages), 1999.

(Continued)

*Primary Examiner*—Thomas Lee
*Assistant Examiner*—Fahmida Rahman
(74) *Attorney, Agent, or Firm*—Baker Botts L.L.P.

(57) ABSTRACT

Techniques are provided for characterizing processor designs and estimating power consumption of software programs executing on processors. A power model of a processor may be obtained by performing simulation using one or more training programs to obtain average power consumption during one or more windows of operation, then using the results to select parameters and coefficients for a processor characterization equation that can estimate power consumption while minimizing error.

29 Claims, 4 Drawing Sheets

OTHER PUBLICATIONS

Lee, et al., "Power Analysis and Low-Power Scheduling Techniques for Embedded DSP Software" (6 pages), 1995.

Sama, et al., "Speeding Up Power Estimation of Embedded Software," (6 pages), 2000.

Steinke, et al., "An Accurate and Fine Grain Instruction-Level Energy Model Supporting Software Optimizations" (pp. 3.2.1-3.2.10), 2001.

Tiwari, et al., "Power Analysis of Embedded Software: A First Step towards Software Power Minimization," © 1994 *ACM* (7 pages), 1994.

Coudert, et al., "What is the State of the Art in Commercial EDA Tools for Low Power," *ISLPED 1996* Monterey CA USA, © 1996.

Russell, et al., "Software Power Estimation and Optimization for High Performance, 32-Bit Embedded Processors," Proceedings for the ICCD '98, © 1998 *IEEE* (6 pages), 1998.

Brandolese, et al., "An Instruction-Level Functionality-Based Energy Estimation Model for 32-Bits Microprocessors," © 2000 *ACM* (pp. 346-351), 2000.

Sami, et al., "Instruction-Level Power Estimation for Embedded VLIW Cores" CODES 2000, (pp. 34-38), 2000.

Givargis, et al. "A Hybrid Approach for Core-Based System-Level Power Modeling," Proceedings of the Asia and South Pacific Design Automation Conference 2000, *IEEE ISBN*, (pp. 141-145), 2000.

Ye, et al., "The Design and Use of SimplePower: A Cycle-Accurate Energy Estimation Tool," *DAC 2000*, © 2000 *ACM* (6 pages), 2000.

Hsieh, et al., "Microprocessor Power Analysis by Labeled Simulation," © 2001 *IEEE* (pp. 182-189), 2001.

Hamburgen, et al. "Computing Practices—Itsy: Stretching the Bounds of Mobile Computing," © 2001 *IEEE* (pp. 28-36), Apr. 2001.

Sinha, et al., "Joule Track—A Web Based Tool for Software Energy Profiling," © 2001 *ACM* (pp. 220-225), Jun. 2001.

Li, et al., "Run-Time Modeling and Estimation of Operating System Power Consumption," SIGMETRICS '03, Jun. 10-14, 2003; © 2003 *ACM* (pp. 160-171), Jun. 2003.

Fujitsu Semiconductor Controller Manual CM71-00333-1E, FR-V Family Softune™ Workbench, User's Manual for V6, Jul. 2003 the first edition. (83 pages), Jul. 2003.

Sinha, et al., "Instruction Level and Operating System Profiling for Energy Exposed Software," IEEE Transactions on Very Large Scale Integration (VLSI) Systems, vol. 11, No. 6, Dec. 2003; © 2003 *IEEE* (pp. 1044-1057).

Laurent, et al., "Functional Level Power Analysis: An Efficient Approach for Modeling the Power Consumption of Complex Processors," Proceedings of the Design, Automation and Test in Europe Conference and Exhibition, © 2004 *IEEE* (2 pages), 2004.

Muttreja, et al., "Automated Energy/Performance Macromodeling of Embedded Software," DAC2004, Jun. 7-11, 2004; © 2004 *ACM* (pp. 99-102), Jun. 2004.

"Muttreja, et al., Hybrid Simulation for Embedded Software Energy Estimation," *DAC 2005*, © 2005 *ACM* (pp. 23-26), Jun. 2005.

EPO Form 2001; Communication pursuant to Article 94(3) EPC; office action regarding Application No. 07 005 237.8-2224 (4 pages), May 12, 2008.

* cited by examiner

ESTIMATING SOFTWARE POWER CONSUMPTION

TECHNICAL FIELD OF THE INVENTION

The present invention relates generally to power analysis and, more particularly, to estimating the power consumption of a software program when executed on a processor.

BACKGROUND OF THE INVENTION

In many electronic systems, it is desirable to know how much power will be used when the system is in operation. Low power consumption is often an important design criteria because the power consumption affects system temperature and battery usage, among other factors. In many instances, software operations influence power consumption.

SUMMARY OF THE INVENTION

In accordance with the present invention, techniques for estimating the power consumption of a software program executed on a processor are provided. According to particular embodiments, these techniques describe a method of estimating the power consumption of a software program run on a particular processor by creating a power model of the processor. After obtaining the processor's power model, the power consumption can be estimated for a variety of software programs to be run on that processor.

According to a particular embodiment, a method of characterizing a processor design includes identifying a training program. An average power consumption for each of a group of timing windows is determined from a low-level simulation of a processor executing the training program. One or more parameters are identified, and, for each of the timing windows, a value for each parameter is determined from a high-level simulation of the training program. An estimated power consumption, which is equal to the sum of each parameter's value multiplied by a coefficient corresponding to that parameter, is determined for each of the timing windows. The coefficients are selected so that the estimated power consumption approximates the average power consumption for a majority of the timing windows.

Embodiments of the invention provide various technical advantages. For example, these techniques may provide a fast and accurate method for estimating the power consumption of a software program running on a processor. Some embodiments provide a method of estimating the power consumption of individual subsystems during short intervals of operation. Particular embodiments provide a method of estimating software power consumption that is faster than gate-level modeling and more accurate than instruction-level modeling. Certain embodiments provide a linear model of the power consumption characteristics of a processor and a method to decide parameters and corresponding coefficients for the linear model that provide accurate estimations of the power consumption of the processor. In some embodiments, the methods of estimating software power consumption are adaptable to many different embedded applications.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which.

DETAILED DESCRIPTION OF THE DRAWINGS

Figure 1:
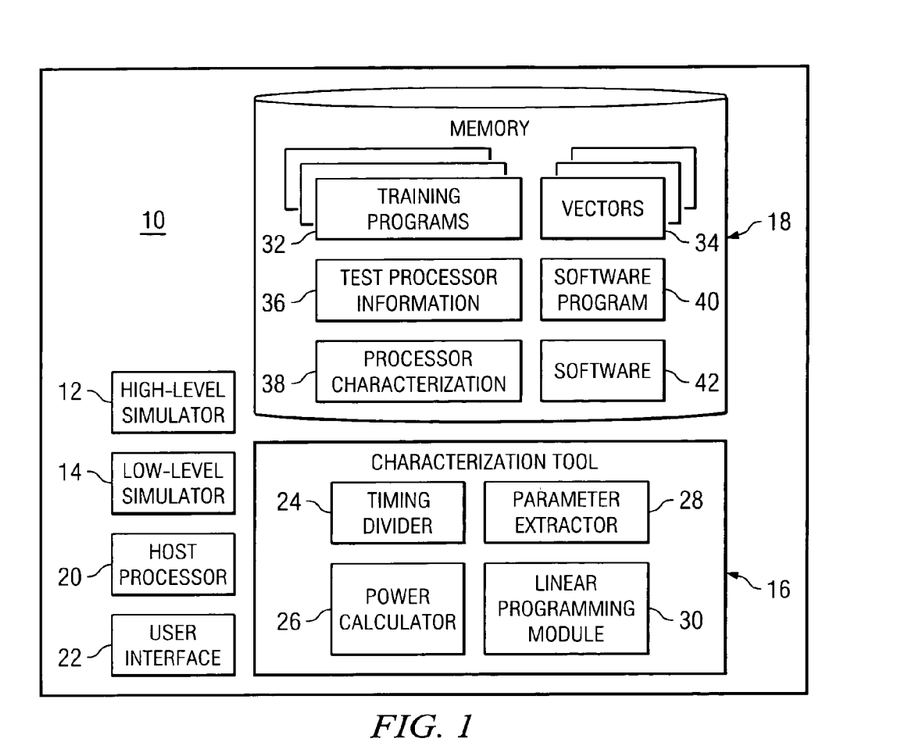
FIG. 1 illustrates a system for estimating software power consumption.

FIG. 1 illustrates a system, indicated generally at 10, for estimating software power consumption. As illustrated, system 10 includes a high-level simulator 12, a low-level simulator 14, a characterization tool 16, a memory 18, a host processor 20, and a user interface 22. In general, elements within system 10 interoperate to estimate software power consumption. While sometimes it is sufficient to estimate the total or average power consumption, in some cases it is necessary to know the amount of power each module of a design consumes and under what program states or input data. A circuit level or a gate-level simulator may be used for this purpose; however, these methods are often too time-consuming.

High-level simulator 12 simulates the running of a program to determine characteristics of the program's operation. According to particular embodiments, high-level simulator 12 receives, as input, a program to be simulated and corresponding test vectors. Following its simulation of the program, high-level simulator 12 provides characteristics regarding the operation of the program. For example, high-level simulator 12 may be an instruction set simulator, which would provide an instruction trace of the program for the given test vectors applied.

Low-level simulator 14 simulates the running of a program on a particular processor to determine characteristics of the program's operation. Low-level simulator 14 primarily differs from high-level simulator 16 in that it may require more time to simulate, but can potentially provide more accurate results when it is used to determine the average power consumption of a program. According to particular embodiments, low-level simulator 14 receives, as input, a program to be simulated, test vectors for the program, and information about the processor on which the program is to be run. For example, low-level simulator 14 may be a gate-level simulator, which would show changes in gates' outputs during the simulation.

Characterization tool 16 creates a power model of a test processor. The power model of the test processor may permit system 10 to quickly and accurately determine the estimated power consumption of software programs implemented on the test processor. According to particular embodiments, to create this power model, characterization tool 16 receives: (i) a high-level simulation of a training program and test vectors and (ii) a low-level simulation of a training program and test vectors run on the test processor. In the illustrated embodiment, high-level simulator 12 provides the high-level simulation, and low-level simulator 14 provides the low-level simulation. As illustrated, characterization tool 16 includes a timing divider 24, a power calculator 26, a parameter extractor 28, and a linear programming module 30.

Timing divider 24 separates both the high-level simulation and the low-level simulation into timing windows corresponding to a particular number of processor cycles. Timing windows may be on the order of a few thousand cycles long. However, system 10 contemplates timing divider 24 using timing windows having any suitable length, whether fixed or variable length, for separating portions of processor operation. In a particular timing window, the high-level simulation and the low-level simulation simulate substantially the same operation of the training program, albeit in different ways. After dividing the high-level simulation and the low-level simulation into timing windows, timing divider 24 passes the low-level simulation to power calculator 26 and passes the high-level simulation to parameter extractor 28.

Power calculator 26 determines the average power consumption of the training program for each timing window using the low-level simulation. It is understood that this determined average power consumption for each timing window need not be perfectly precise. Power calculator 26 sends its results to linear programming module 30.

Parameter extractor 28 determines the value of a parameter (or set of parameters) in the high-level simulation for each timing window. A parameter represents a characteristic or set of characteristics about a program obtainable from a high-level simulation of the program. By way of example, parameters can include the number of instruction cache accesses, the number of taken branch executions predicted as a taken branch, and the number of pairs of two consecutive load instructions which access the same cache line. For each of the timing windows, parameter extractor 28 determines the value of a parameter (or set of parameters) in the high-level simulation. For example, the high-level simulation for one timing window may show that there are ten instruction cache accesses. If the number of instruction cache accesses is a parameter, then parameter extractor 28 will determine that the value of that parameter is ten. Parameter extractor 28 sends its results to linear programming module 30. In some embodiments, parameter extractor 28 may also determine which parameters to evaluate. The parameters evaluated can be used by linear programming module 30 to create the power model of the test processor.

As illustrated, linear programming module 30 creates the power model of a test processor using the average power consumption obtained from the power calculator 26 and the parameters and values obtained from parameter extractor 28. For each timing window, the parameters, multiplied by corresponding coefficients, should approximate the average power consumption for that timing window. The difference between the average power consumption of a timing window and the estimated power consumption, calculated from the parameters and coefficients, is the power estimation error. Linear programming module 30 finds the optimal coefficients for the parameters, which minimize the power estimation error. In some embodiments, linear programming module 30 will evaluate whether the power estimation error is less than a specific bound. If not, linear programming module may add a parameter to the analysis by requesting new data from parameter extractor 28. In other embodiments, linear programming module 30 will evaluate whether the value of a parameter multiplied by its corresponding coefficient is very small compared to the other terms in the equation. If this is the case, linear programming module 30 may determine not to use the parameter due to its weak impact on the power estimation.

While characterization tool 16 is depicted as a single element containing a particular configuration and arrangement of modules, it should be noted that this is a logical depiction, and the components and functionality of characterization tool 16 may be located at one or more physical locations. Also, the functionality of characterization tool 16 may be provided by any suitable collection and arrangement of components. The functions performed by the various components of characterization tool 16 may be accomplished by any suitable devices and logic modules to provide a power model of a processor. For example, characterization tool 16 may be logic encoded in media.

In the illustrated embodiment, system 10 also includes memory 18. Memory 18 is shown as including training programs 32, vectors 34, test processor information 36, processor characterization 38, software program 40, and software 42. While information located in memory 18 is graphically depicted as individual files, folders, or other storage elements, it is understood that the equivalent information can be stored in any appropriate manner.

Training programs 32 and vectors 34 are used to create a power model of the test processor. Training programs 32 and vectors 34 are sent to high-level simulator 12 to obtain a high-level simulation for each of the training programs 32 run with its corresponding vectors 34. Training programs 32, vectors 34, and test processor information 36 are sent to low-level simulator 14 to obtain a low-level simulation for each of the training programs 32 run on the test processor with the corresponding vectors 34. Characterization tool 16 uses the high-level and low-level simulations of the training programs 32 run on the test processor in order to create the power model of the test processor. Once determined, the power model is stored as processor characterization 38. Processor characterization 38 can be used to estimate the software power consumption of software program 40. In some embodiments, memory 18 includes multiple software programs 40, and elements of system 10 may operate to determine an estimate of the software power consumption for each of software programs 40.

Software 42 includes any suitable programs, software, hardware, logic, or circuitry and is capable when executed to control the operation of various elements in system 10. Software 42 may be included in another part of system 10 outside of memory 18. Also, software 42 may or may not be included in memory 18 or system 10.

As illustrated, host processor 20 estimates software power consumption of software program 40 using processor characterization 38. Host processor 20 may request a high-level simulation of software program 40 from high-level simulator 12. In particular embodiments, software program 40 is accompanied by test vectors, which may or may not be stored in vectors 34. After receiving the high-level simulation, host processor 20 may divide the high-level simulation into time intervals. Each designated time interval can provide an estimated software power consumption for that timing window. These time intervals may be the same length as timing windows used to analyze the training programs or may be a different length. In some embodiments, the high-level simulation is not divided into time intervals. In particular embodiments, host processor 20 obtains the divided high-level simulation from timing divider 24. By using timing windows, host processor 20 can determine the power consumption of software program 40 over particular intervals of time.

For each time interval of the high-level simulation, host processor 20 determines the value of each parameter specified by processor characterization 38. In particular embodiments, host processor 20 obtains the parameter values from parameter extractor 28. After determining the value of each parameter specified by processor characterization 38, host processor 20 calculates the estimated power consumption of software program 40 by evaluating processor characterization 38 using the determined parameter values. This process can be repeated for each time interval identified for software program 40. While illustrated as a single module, host processor 20 may include any suitable programs, software, hardware, logic, or circuitry and may control the operation of various elements in system 10.

User interface 22 provides an interface through which a user can communicate with and receive information from system 10. In particular embodiments, a user can select which parameters should be used by characterization tool 16 to determine processor characterization 38. In some embodiments, a user can identify an additional parameter that should be used by characterization tool 16 when the power estimation error is greater than or equal to a specific bound. In certain embodiments, user interface 22 can display the power estimation error remaining after processor characterization 38 is obtained. In some embodiments, user interface 22 can display processor characterization 38 after it is determined by characterization tool 16. In particular embodiments, user interface 22 displays the estimated software power consumption of software program 40. This display may be done, for example, in a tabular or graphical form. User interface may or may not be included in system 10 and may be provided by any suitable collection and arrangement of components.

The particular embodiments of a system for estimating software power consumption illustrated and described and are not intended to be all inclusive. The elements within system 10 interconnect using any suitable techniques or protocols. While system 10 is depicted as containing a certain configuration and arrangement of elements, it should be noted that this is a logical depiction, and the components and functionality of system 10 may be combined, separated and distributed as appropriate both logically and physically. Also, the functionality of system 10 may be provided by any suitable collection and arrangement of components. The functions performed by the various components of system 10 may be accomplished by any suitable devices or logic to estimate software power consumption by creating a power model.

Figure 2:
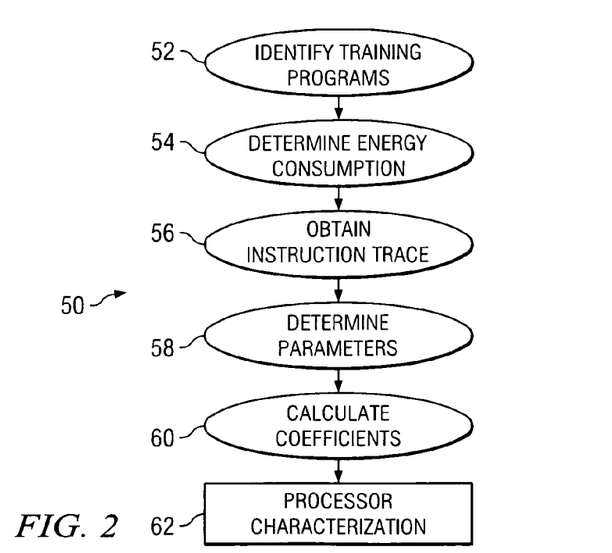
FIG. 2 is a flowchart illustrating a generalized method for characterizing a processor to determine a model for estimating software power consumption.

FIG. 2 is a flowchart illustrating a generalized method 50 for characterizing a processor to determine a model for estimating software power consumption. As illustrated in method 50, a processor is characterized using a linear approximation model. The energy consumption may be modeled using a linear formula:

$$E_{estimate} = \sum_{i=0}^{N} c_i \cdot P_i \quad (1)$$

In Equation (1), $P_i$'s, $c_i$'s and N are the parameters of the model, the corresponding coefficients, and the number of parameters, respectively. After selecting the parameters, the corresponding coefficients are selected to reduce the difference between the estimated energy consumption, $E_{estimate}$, and the actual energy consumption. In the illustrated embodiment, the actual energy consumption is assumed to closely approximate the energy consumption estimated by a low-level simulation, $E_{low}$. After selecting the parameters and determining the coefficients, the estimated energy consumption, $E_{estimate}$, for a variety of programs can be calculated using Equation (1).

In step 52, characterization tool 16 identifies which training programs 32 and vectors 34 will be used to create processor characterization 38. Selected training programs 32 and vectors 34 may represent a target application domain or may be designed to incorporate characteristics of various application domains. In particular embodiments, user interface 22 can be incorporated so that a user may identify which training programs 32 and vectors 34 should be used to create processor characterization 38. In other embodiments, all training programs 32 and corresponding vectors 34 stored in memory 18 are used to create processor characterization 38.

Next, characterization tool 16 determines the energy consumption of each training program 32 in step 54. In certain embodiments, the energy consumption of each training program 32 is determined for each of a plurality of timing windows. In some embodiments, characterization tool 16 determines the energy consumption from a low-level simulation of each training program 32 obtained from low-level simulator 14. Power calculator 26 may determine the energy consumption from the low-level simulation and send the energy consumption values to linear programming module 30. While step 54 may be time-consuming, in many instances it only needs to be done once to create a processor characterization 38 for a particular processor.

In step 56, characterization tool 16 determines an instruction trace for each training program 32 in step 56. Alternatively, characterization tool 16 may use another high-level simulation in step 56 from which parameter values can be determined. Characterization tool 16 sends training programs 32 and corresponding vectors 34 to high-level simulator 12 to receive a high-level simulation, such as an instruction trace, for each training program 32.

In step 58, characterization tool 16 determines parameters, $P_i$, to be used in the power model of the test processor. In some embodiments, a user can select which parameters to use to determine processor characterization 58 through user interface 22. In other embodiments, characterization tool 16 or another element in system 10, for example parameter extractor 28, determines which parameters should be used. $P_i$'s should be parameters whose values can be easily extracted from instruction traces. For example, the following characteristics of a program may function as parameters.

$P_{IM}(P_{DM})$: The number of instruction (data) cache misses $P_{U0}(P_{U1})$: The number of untaken (taken) branch instructions predicted as untaken (taken) branch $P_{T0}(P_{T1})$: The number of taken (untaken) branch instructions predicted as untaken (taken) branch $P_{LR}$: The number of branch instructions which use a link register $P_{JM}$: The number of branch instructions which always jump to an absolute address (e.g., CALL and JUMP)

$P_{LI}(P_{SI})$: The number of load (store) instructions executed $P_{LM}(P_{SM})$: The number of load (store) instructions which cause a data cache miss.

$P_{GS}$: The number of "MOVGS" instructions which move data from general purpose register to off-chip memory $P_{SG}$: The number of "MOVSG" instructions which move data from off-chip memory to general purpose register $P_{IA}(P_{DA})$: The number of instruction (data) cache accesses $P_{LU}(P_{LT})$: The number of taken (untaken) branch instructions predicted as taken branch, which is located at the end of a cache line $P_{LL1M}(P_{LL1H})$: The number of pairs of two consecutive load instructions which access the same cache line, where the first instruction results in a cache miss (hit)

$P_{SS1}(P_{SS2})$: The number of pairs of two consecutive store instructions which do (not) access the same cache line $P_{LL2}$: The number of pairs of two consecutive store instructions which do not access the same cache line $P_{C2}$: The number of instructions using way-1 and way-2 of a 2-way VLIW processor if the target is a VLIW processor This list of characteristics is not intended to be all inclusive. The parameters used to determine processor characterization 38 can include all, some, or none of these listed characteristics. Moreover, individual parameters may include combinations of these or other characteristics.

In step 60, linear programming module 30 calculates a set of coefficients, $c_i$'s, to correspond to the set of parameters, $P_i$'s. For a set of parameters, linear programming module 30 may find coefficients which minimize the energy estimation error, $|E_{estimate} - E_{low}|$, where $E_{low}$ and $E_{estimate}$ are the energy consumption values obtained through step 54 and Equation (1), respectively. In some embodiments, linear programming module 30 evaluates whether the energy estimation error, with the coefficients determined, is less than a specific bound, $E_{const}$. If the energy estimation error is sufficiently small, the current set of parameters and coefficients is incorporated in processor characterization 38. Otherwise, linear programming module 30 may add a new parameter and re-calculate the coefficients and energy estimation error. In particular embodiments, linear programming module 30 evaluates whether the value of a parameter multiplied by its corresponding coefficient is small compared to the other terms in the equation. If this is the case, linear programming module 30 may discard that parameter due to its weak impact on processor characterization 38 and the power estimation. In some embodiments, step 60 is repeated until the energy estimation error becomes less than the specific bound, $E_{const}$.

In step 62, characterization tool 16 produces processor characterization 38 and stores it in memory 18. Processor characterization 38 can be used to estimate the power consumption for a variety of software programs, for example software program 40.

The method described with respect to FIG. 2 is merely illustrative, and it is understood that the manner of operation and devices indicated as performing the operations may be modified in any appropriate manner. While the method describes particular steps performed in a specific order, it should be understood that system 10 contemplates any suitable collection and arrangement of elements performing some, all, or none of these steps, or additional steps, in any operable order.

Figure 3:
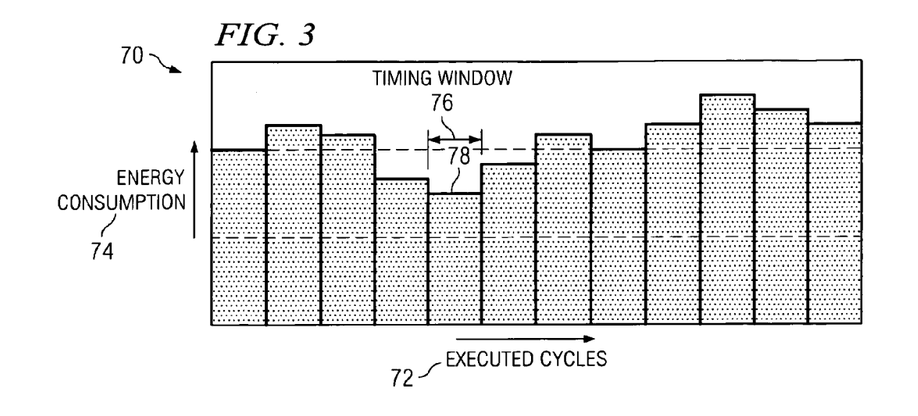
FIG. 3 is a diagram illustrating an example of dividing processor cycles into timing windows, each having a corresponding power consumption.

FIG. 3 is a diagram illustrating an example of dividing processor cycles into timing windows, each having a corresponding energy consumption. The graph, illustrated generally at 70, shows the number of executed cycles 72 on the horizontal axis and energy consumption 74 on the vertical axis. Executed cycles 72 are divided into a plurality of timing windows, e.g. timing window 76. Timing window 76 has a particular energy consumption 78 for executed cycles 72 falling within timing window 76. Energy consumption 78 may be determined by power calculator 26, which calculates the energy consumption for the timing windows of a low-level simulation of one of training programs 32. Energy consumption 78 may also be determined by power calculator 26 or host processor 20 when it determines the energy consumption for the timing windows of software program 40. In certain embodiments, user interface 22 is operable to display graph 70, and other similar graphs, to communicate to a user the estimated or average energy consumption of software program 40, training programs 32, or any other appropriate program or application.

Although graph 70 is displayed as having particular characteristics, features, and inputs, it is understood that similar characteristics or features could be implemented by (and similar inputs can be derived from) any number and type of components and/or devices. Additionally, the functions performed by those components and/or devices may be performed in any appropriate order and/or may be omitted entirely. While illustrated in one manner, graph 70 is intended to include any necessary components or functionality.

Figure 4:
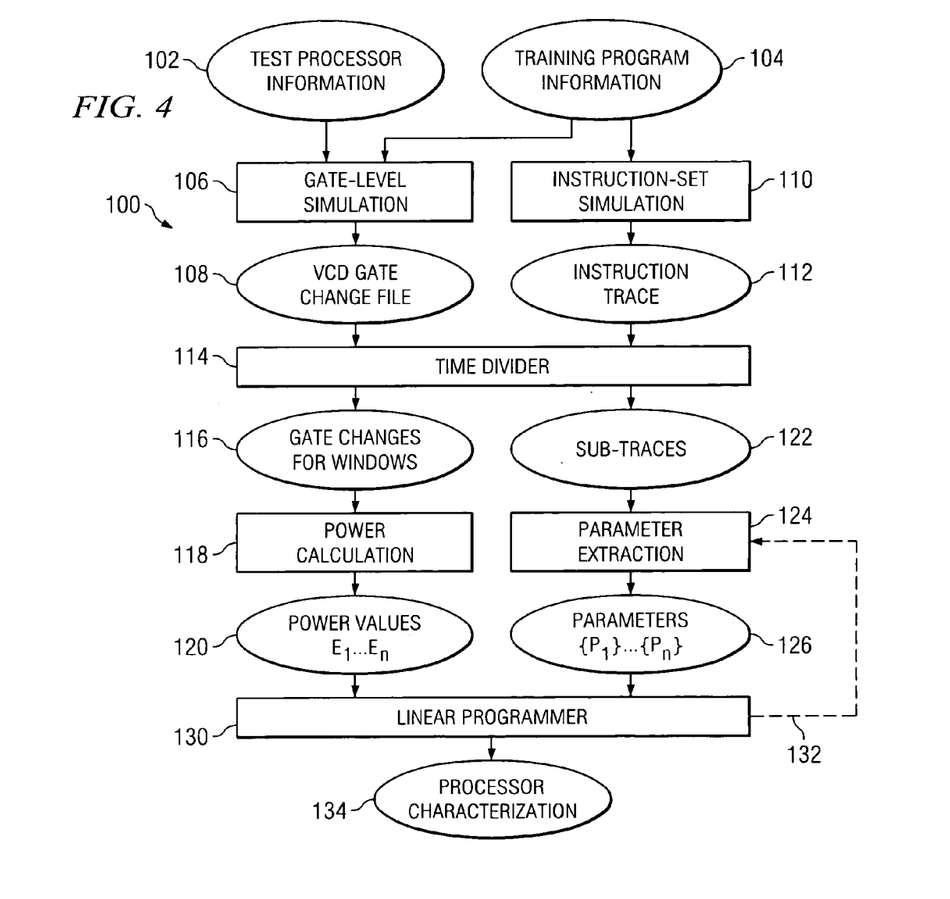
FIG. 4 illustrates a data flow diagram for characterizing a processor to determine a model for estimating software power consumption.

FIG. 4 illustrates a data flow diagram, indicated generally at 100, for characterizing a test processor to determine a model for estimating software power consumption. Test processor information 102 and training program information 104 are inputted to gate-level simulation 106. Test processor information 102 includes any type of data regarding the test processor that is required by gate-level simulation 106. Test processor information 102 may be stored in memory 18 as test processor information 36. In some embodiments, test processor information 102 includes a netlist and cell library. Training program information 104 includes a training program and its vectors, which may be stored in memory as one of training programs 32 and one of vectors 34. The training program and vectors are used to evaluate the processor in order to derive a processor characterization. Training program information 104 may represent a target application domain or may be designed to incorporate characteristics of various application domains. In some embodiments, the selection of the training program and vectors included in training program information 104 impacts the accuracy of the power estimation and computation time required for the characterization. In particular embodiments, training program information 104 includes multiple individual training programs 32 and vectors 34 corresponding to each program. In some embodiments, training program information 104 includes many different types of programs.

Gate-level simulation 106 performs a low-level simulation of the training program specified by training program information 104 run on the test processor described by test processor information 102. As illustrated, gate-level simulation 106 produces a value change dump file showing the gate changes, illustrated as VCD gate change file 108. In some embodiments, gate-level simulation 106 of the training program is obtained from low-level simulator 14. As illustrated, VCD gate change file 108 is communicated to time divider 114.

Instruction-set simulation 110 receives training program information 104 and performs a high-level simulation of the training program (or, in some embodiments, programs) specified by training program information 104. Instruction-set simulation 110 produces instruction trace 112, which is passed to time divider 114. In particular embodiments, instruction-set simulation 110 is performed by high-level simulator 12. In some embodiments, instruction-set simulation 110 operates in parallel with gate-level simulation 106. In other embodiments, instruction-set simulation 110 operates in series with gate-level simulation 106, with either operation performed first.

Time divider 114 receives VCD gate change file 108 and instruction trace 112 and divides each into timing windows. Each timing window represents a particular number of cycles of the simulated test processor running training program information 104. Some embodiments do not divide VCD gate change file 108 and instruction trace 112 into timing windows. Other embodiments divide VCD gate change file 108 and instruction trace 112 into timing windows, where each window represents an operation of the test processor over a number of cycles. Timing windows may be a fixed or variable length.

By dividing VCD gate change file 108 into timing windows, time divider 114 and power calculation 118 can identify the changes in gates' outputs corresponding to each timing window. These changes are represented as gate changes for windows 116 and communicated to power calculation 118. Similarly, instruction trace 112 is divided into smaller sub-traces, each of which corresponds to a timing window. The timing windows into which instruction trace 112 is divided correspond with the timing windows into which VCD gate change file 108 is divided. Once determined, sub-traces 122 are communicated to parameter extraction 124. In particular embodiments, dividing instruction trace 112 into timing windows requires estimating the number of cycles executed. For example, instruction set simulation 110 can be performed by a cycle-inaccurate instruction set simulator. A cycle-inaccurate instruction set simulator does not simulate the behavior of each pipeline stage, as it does not calculate the number of penalty cycles for pipeline stalls, cache misses, branch prediction misses, etc. In these embodiments, the execution cycles may be estimated by adding or deleting parameters and evaluating error iteratively until the error becomes less than a specific bound.

Power calculation 118 uses gate changes for windows 116 to determine the power values 120. Power values 120 may represent the power consumption of the training program running on the test processor. Each timing window has a corresponding power value 120. Power values 120 are communicated to linear programmer 130. In the illustrated embodiment, power values 120 are based on the low-level simulation performed by gate-level simulation 106. Thus, in some embodiments, power values 120 are not an exact power consumption of the training program running on the test processor. However, power values 120 provide a sufficiently accurate estimation of the power consumption. In particular embodiments, power calculator 26 determines power values 120.

Parameter extraction 124 uses sub-traces 124 to determine parameters 126 to use in the power model of the test processor. In certain embodiments, parameter extraction 124 is performed by parameter extractor 28. In some embodiments, a user can select some or all of parameters 126 through user interface 22. In other embodiments, characterization tool 16 or another element in system 10, for example parameter extractor 28, determines which parameters are used.

Parameters 126 should be characteristics that can be extracted from a high-level simulation, for example instruction traces, such as sub-traces 122. Parameters 126 may include any of the characteristics listed in the discussion of FIG. 2, step 58. However, it is understood that this list of characteristics is not intended to be all inclusive, and parameters 126 can include all, some, or none of these listed characteristics. Parameters 126 are sent to linear programmer 130.

Linear programmer 130 calculates a set of coefficients to correspond to parameters 126 in processor characterization 134. Linear programmer 130, which may be performed by linear programming module 30, creates a processor characterization 134, which may correspond to processor characterization 58. Processor characterization 134 uses a linear approximation model to characterize the power consumption of the test processor. Linear programmer 130 may model power consumption using the linear formula from Equation (1):

$$E_{estimate} = \sum_{i=0}^{N} c_i \cdot P_i$$

$P_i$'s, $c_i$'s and N are the parameters of the model, the corresponding coefficients and the number of parameters, respectively. Initially, the parameters of the model are parameters 126.

Generally, to create processor characterization 134, linear programmer 130 finds coefficients which minimize the energy estimation error, $|E_{estimate} - E_{low}|$, where $E_{low}$, is determined by power values 120 and $E_{estimate}$ is determined by Equation (1). Linear programmer module 130 determines the set of coefficients which minimize the energy estimation error for all timing windows. The problem can be formally defined as: "For given sets of $E_i$'s and $P_{ij}$'s, find a set of coefficients $c_j$'s which minimize the total error, $Y_{obj}$." The variables are defined as:

i: Timing window index
    j: Parameter index
    N: The number of parameters
    M: The number of timing windows
    $E_i$: The energy value for the $i^{th}$ time window estimated using gate-level simulation
    $E'_i$: The energy value for the $i^{th}$ time window obtained using Equation (1)
    $Y_i$: The absolute error value $|E'_i - E_i|$
    $P_{ij}$: The parameter extracted from the instruction trace
    $c_j$: Coefficient to be determined To find the set of coefficients, minimize:

$$Y_{obj} = x_{max} \cdot Y_{max} + x_{ave} \cdot Y_{ave}$$

where $$Y_{max} = \max(Y_i) \text{ and } Y_{ave} = \frac{\sum_{i=0}^{M} Y_i}{M}$$

Subject to:

$$-Y_i \leq \left( \sum_{j=0}^{m} c_j \cdot P_{ij} \right) - E_i \leq Y_i \quad (i = 0 \ldots M-1)$$

$$c_j, P_{ij}, E_i, Y_i \geq 0 \quad (i = 0 \ldots M-1, j = 0 \ldots N-1)$$

$$Y_{max} - Y_i \geq 0 \, (i = 0 \ldots M-1)$$

$$x_{max} + x_{ave} \geq 1 \, (x_{max}, x_{ave} \in \{0, 1\})$$

Based on the values selected for $x_{max}$ and $x_{ave}$, one of three different objective functions can be minimized: (1) the average error, $$\frac{\sum(|E'-E|)}{M},$$

(2) the maximum error, max (|E'−E|), or (3) the sum of the average and the maximum errors. In particular embodiments, the values of $X_{max}$ and $x_{ave}$ are not limited to one or zero, allowing the linear programmer 130 to minimize a weighted average of the average and the maximum errors. In some embodiments, the values of $x_{max}$ and $x_{ave}$ are selected by the user.

After determining the coefficients corresponding to parameters 126, linear programmer 130 creates processor characterization 134. In some embodiments, linear programmer 130 may send a request 132 for additional parameters to parameter extraction 124 when the energy estimation error inherent in the model is too large. This embodiment is described below with respect to FIG. 5. After determining processor characterization 134, the estimated energy consumption, $E_{estimate}$, for a variety of software programs can be calculated using processor characterization 134 and the values of parameters 126 for the software programs. This process is described below with respect to FIG. 6.

The method described with respect to FIG. 4 is merely illustrative, and it is understood that the manner of operation and devices indicated as performing the operations may be modified in any appropriate manner. While the method describes particular steps performed in a specific order, it should be understood that system 10 contemplates any suitable collection and arrangement of elements performing some, all, or none of these steps, or additional steps, in any operable order.

Figure 5:
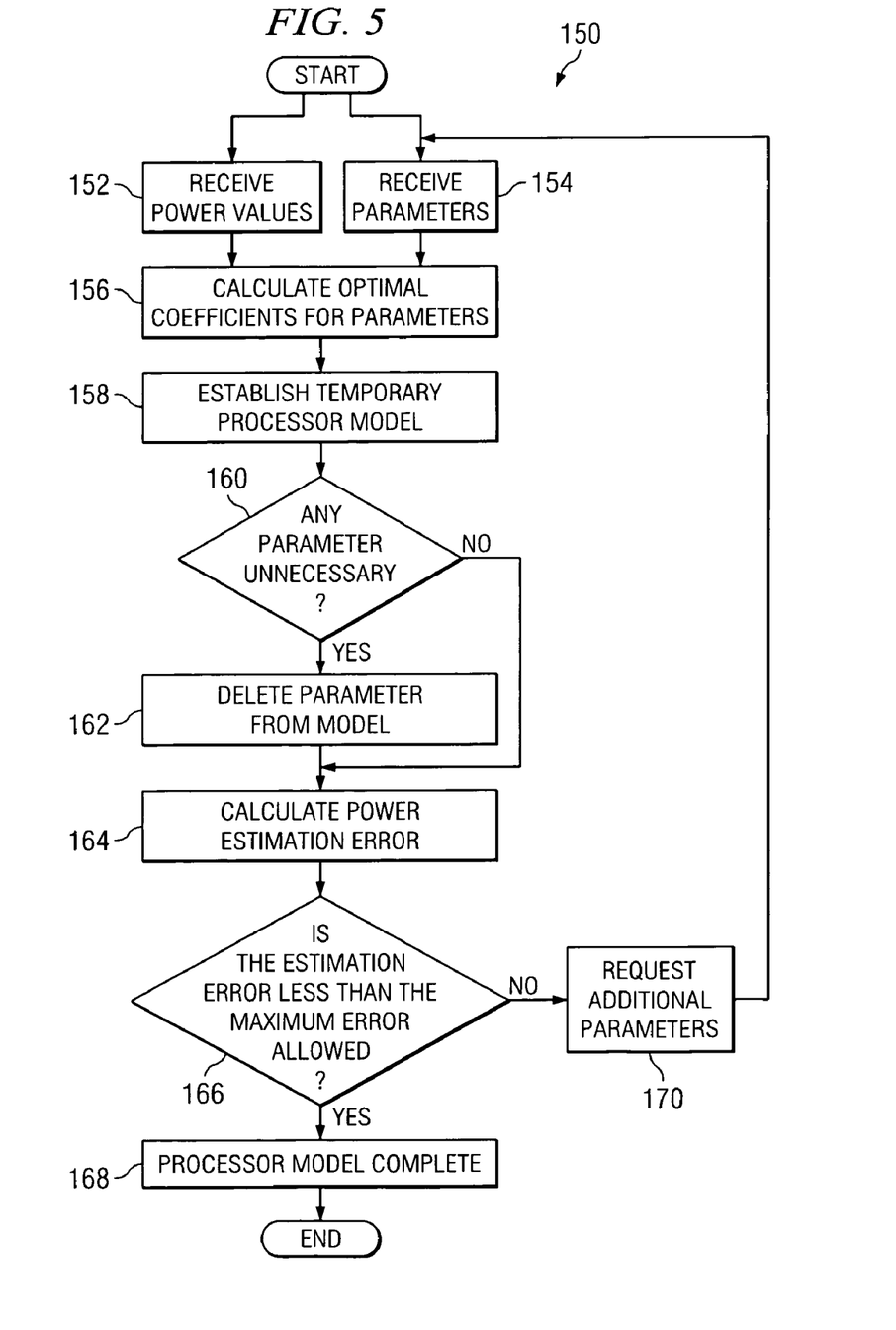
FIG. 5 is a flowchart illustrating the operation of a linear programmer to determine a model for estimating software power consumption.

FIG. 5 is a flowchart, indicated generally at 150, illustrating the operation of a linear programmer to determine a model for estimating software power consumption.

At step 152, linear programmer 130 receives power values 120 obtained from power calculation 118. At step 154, in parallel with step 152, linear programmer 130 receives parameters 126 obtained from parameter extraction 124. In step 156, linear programmer 130 calculates optimal coefficients for parameters 126. In some embodiments, this is accomplished as described with respect to FIG. 4.

For step 160, linear programmer 130 determines whether any of parameters 126 are unnecessary. In particular embodiments, linear programmer 130 evaluates whether the value of any of parameter 126 multiplied by its corresponding coefficient is small compared to the other terms in the equation. If a parameter is unnecessary, the method proceeds to step 162, where the particular parameter is deleted from parameters 126 and the current power model. The particular parameter may not be used due to its weak impact on the power model of the test processor and the power estimation. If all of parameters 126 are deemed necessary, the method proceeds to step 164.

In step 164, linear programmer 130 calculates the power estimation error of the current power model. For each timing window, the power estimation error can be represented by $|E_{estimate}-E_{low}|$, where $E_{low}$ is the corresponding one of power values 120 and $E_{estimate}$ is determined by the current power model. In some embodiments, the power estimation error of the current power model for all timing windows can be found by one of three different objective functions: (1) the average error, $$\frac{\sum(|E'-E|)}{M},$$

(2) the maximum error, max(|E'−E|), or (3) the sum of the average and the maximum errors.

In step 166, linear programmer 130 evaluates whether the power estimation error determined in step 164 is less than a specific bound, $E_{const}$. If the power estimation error is sufficiently small, the method proceeds to step 168 and the power model is complete, resulting in processor characterization 134. If the power estimation error is too large, the method proceeds to step 170, where the linear programmer 130 requests additional parameters for use in the power model. In some embodiments, linear programmer 130 sends a request 132 to parameter extraction 124 for an additional parameter or parameters. In some embodiments, parameter extractor 28 determines which additional parameters are to be used. In other embodiments, a user selects additional parameters through user interface 22. After the new parameter(s) are added to parameters 126, the method proceeds to step 154, where the received parameters comprise both the original parameters 126 and the added parameter(s). Then, the method recalculates the optimal coefficients and determines a new current power model. In some embodiments, these steps are repeated until the power estimation error becomes less than the specific bound, $E_{const}$. In particular embodiments, linear programmer 130 incorporates a time-out function that prevents endless looping.

The method described with respect to FIG. 5 is merely illustrative, and it is understood that the manner of operation and devices indicated as performing the operations may be modified in any appropriate manner. While the method describes particular steps performed in a specific order, it should be understood that system 10 contemplates any suitable collection and arrangement of elements performing some, all, or none of these steps, or additional steps, in any operable order.

Figure 6:
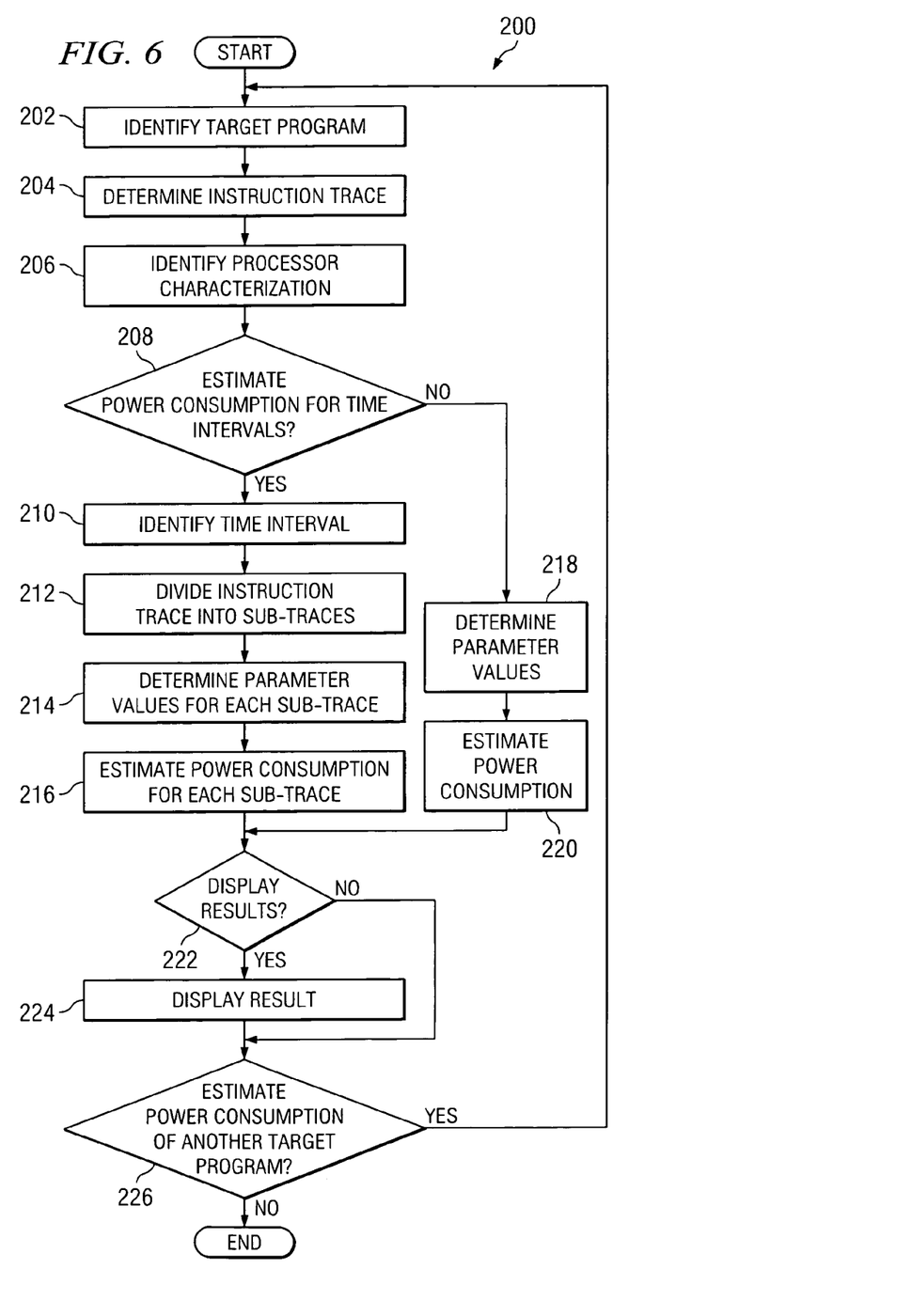
FIG. 6 is a flowchart illustrating a method for using the processor characterization to estimate the power consumption of a target program.

FIG. 6 is a flowchart, indicated generally at 200, illustrating a method for using a processor characterization to estimate the power consumption of a target program. In step 202, a target program is identified. In some embodiments, the target program is software program 40 stored in memory 18. Next, host processor 20 determines the instruction trace of the target program in step 204. Host processor 20 may provide the target program to high-level simulator 12 to obtain the instruction trace. In certain embodiments, host processor 20 creates a different high-level simulation of the target program from which the values of parameters specified by processor characterization 38 can be obtained.

The method proceeds to step 206, where host processor 20 identifies processor characterization 38 for the test processor. As illustrated, the power consumption of a target program is estimated for a target program run on a particular test processor. In particular embodiments, step 206 includes loading processor characterization 38. In certain embodiments, step 206 includes determining processor characterization 38.

In step 208, host processor 20 determines whether the power consumption should be estimated for time intervals or for the entire target program. If the power consumption should be estimated for individual time intervals, the method proceeds to step 210, where host processor 20 identifies the time interval. This time interval is similar to the timing windows used to obtain processor characterization 38. In some embodiments, the time intervals used to divide a target program may be unequal in length. It is understood that the time interval can be any applicable length. In step 212, the instruction trace of the target program, obtained in step 204, is separated into sub-traces corresponding to each time interval. Then, in step 214, host processor 20 determines, for each sub-trace, the value of each parameter specified by processor characterization 38. In some embodiments, the values of the parameters are obtained directly from the sub-trace of the target program. In other embodiments, evaluating the parameters requires additional processing of the sub-traces. After the values of the parameters have been identified, host processor 20 estimates the power consumption for each sub-trace using the obtained parameter values, step 216.

If, in step 208, host processor 20 determines that the power consumption should be estimated for the entire target program, the method proceeds to step 220. In step 220, host processor 20 determines the value of each parameter specified by processor characterization 38. In some embodiments, the values of the parameters are obtained directly from the instruction trace of the target program. In other embodiments, evaluating the parameters requires additional processing of the instruction trace. After the values of the parameters have been identified, host processor 20 estimates the power consumption of the target program using the parameter values, step 220.

From both step 220 and step 216, the method proceeds to step 222, where host processor 20 determines whether the results should be displayed. In some embodiments, host processor 20 instead, or in addition, determines whether the results should be stored or saved. If so, host processor 20 displays the results in step 224. In some embodiments, host processor 20 displays the results using user interface 22. If the results should not be displayed, step 224 is skipped. The method proceeds to step 226, where host processor 20 determines whether the power consumption of another target program should be estimated. If so, the method returns to step 202, and if not method 200 is complete.

The method described with respect to FIG. 6 is merely illustrative, and it is understood that the manner of operation and devices indicated as performing the operations may be modified in any appropriate manner. In some embodiments, a component of system 10 other than host processor 20, or an element outside system 10, operates to estimate the power consumption of the target program from processor characterization 38. While the method describes particular steps performed in a specific order, it should be understood that system 10 contemplates any suitable collection and arrangement of elements performing some, all, or none of these steps, or additional steps, in any operable order.

Although the present invention has been described in several embodiments, a myriad of changes and modifications may be suggested to one skilled in the art, and it is intended that the present invention encompass such changes and modifications as fall within the present appended claims.

What is claimed is:

1. A method of characterizing a processor design comprising:
  identifying a training program;
  establishing a plurality of timing windows from a low-level simulation of a processor executing the training program, each of the plurality of timing windows corresponding to a particular number of processor cycles;
  determining an average power consumption for each of the plurality of timing windows;
  identifying one or more parameters;
  for each of the timing windows, determining a value for each parameter from a high-level simulation of the training program;
  for each of the timing windows, determining an estimated power consumption equal to a summation of the value of each parameter multiplied by a coefficient corresponding to that parameter; and
  selecting the coefficients so that the estimated power consumption approximates the average power consumption for a majority of the timing windows.

2. The method of claim 1, wherein:
  the training program is a first training program; and
  the timing windows are a first plurality of timing windows;
  the method further comprising:
    identifying a second training program;
    determining an average power consumption for each of a second plurality of timing windows from a low-level simulation of the processor executing the second training program;
    for each of the second plurality of timing windows, determining a value for each parameter from a high-level simulation of the second training program;
    for each of the second plurality of timing windows, determining an estimated power consumption equal to a summation of the value of each parameter multiplied by the coefficient corresponding to that parameter; and
    selecting the coefficients so that the estimated power consumption approximates the average power consumption for a majority of both the first plurality of timing windows and the second plurality of timing windows.

3. The method of claim 1, wherein the estimated power consumption approximates the average power consumption when the difference between the estimated power consumption and the average power consumption is less than a constant.

4. The method of claim 1, wherein the timing windows are a first plurality of timing windows, the method further comprising:
  identifying a software program;
  for each of a second plurality of timing windows, determining a value for each parameter from a high-level simulation of the software program; and
  for each of the second plurality of timing windows, calculating an estimated power consumption of the software program from a summation of the value of each parameter multiplied by the coefficient corresponding to that parameter.

5. The method of claim 1, wherein the training program represents an application domain.

6. The method of claim 1, wherein:
  for each of the timing windows, a power estimation error is equal to the difference between the estimated power consumption and the average power consumption; and
  the estimated power consumption approximates the average power consumption when an error value is minimized, wherein the error value is equal to one selected from:
    a maximum power estimation error, wherein the maximum power estimation error is equal to largest power estimation error for all timing windows;

an average power estimation error, wherein the average power estimation error is equal to average of the power estimation error for each timing window; and
a weighted sum of the maximum power estimation error and the average power estimation error.

7. The method of claim 1, wherein the low-level simulation is a gate-level simulation and the high-level simulation is an instruction-set simulation.

8. The method of claim 1, wherein the parameters include at least one selected from:
the number of instruction cache misses; the number of data cache misses; the number of untaken branch instructions predicted as untaken branch; the number of taken branch instructions predicted as taken branch; the number of taken branch instructions predicted as untaken branch; the number of untaken branch instructions predicted as taken branch; the number of branch instructions which use a link register; the number of branch instructions which always jump to an absolute address; the number of load instructions executed; the number of store instructions executed; the number of load instructions which cause a data cache miss; the number of store instructions which cause a data cache miss; the number of instructions which move data from general purpose register to off-chip memory; the number of instructions which move data from off-chip memory to general purpose register; the number of instruction cache accesses; the number of data cache accesses; the number of taken branch instructions predicted as taken branch, which is located at the end of a cache line; the number of untaken branch instructions predicted as taken branch, which is located at the end of a cache line; the number of pairs of two consecutive load instructions which access the same cache line, where the first instruction results in a cache miss; the number of pairs of two consecutive load instructions which access the same cache line, where the first instruction results in a cache hit; the number of pairs of two consecutive store instructions which do access the same cache line; the number of pairs of two consecutive store instructions which do not access the same cache line; and the number of instructions using way-1 and way-2 of the 2-way VLIW processor.

9. The method of claim 1, wherein the summation of the value of each parameter multiplied by the corresponding coefficient provides a linear equation that models the processor.

10. The method of claim 1, wherein:
the high-level simulation is obtained from a cycle inaccurate simulator; and
the particular number of processor cycles is estimated using a linear equation.

11. The method of claim 1, wherein one or more of the parameters are deleted based on an evaluation of the coefficients selected.

12. The method of claim 1, wherein one or more new parameters are added to the parameters based on an evaluation of a difference between the estimated power consumption and the average power consumption.

13. A device for characterizing a processor design comprising:
a characterization tool operable to identify a training program;
a timing divider operable to establish a plurality of timing windows from a low-level simulation of a processor executing the training program, each of the plurality of timing windows corresponding to a particular number of processor cycles;
a power calculator operable to determine an average power consumption for each of the plurality of timing windows;
a parameter extractor operable to identify one or more parameters and further operable to, for each of the timing windows, determine a value for each parameter from a high-level simulation of the training program; and
a linear programming module operable to, for each of the timing windows, determine an estimated power consumption equal to a summation of the value of each parameter multiplied by a coefficient corresponding to that parameter, the linear programming module further operable to select the coefficients so that the estimated power consumption approximates the average power consumption for a majority of the timing windows.

14. The device of claim 13, wherein:
the training program is a first training program;
the timing windows are a first plurality of timing windows;
the characterization tool is further operable to identify a second training program;
the power calculator is further operable to determine an average power consumption for each of a second plurality of timing windows from a low-level simulation of the processor executing the second training program;
the parameter extractor is further operable to, for each of the second plurality of timing windows, determine a value for each parameter from a high-level simulation of the second training program; and
the linear programming module is further operable to, for each of the second plurality of timing windows, determine an estimated power consumption equal to a summation of the value of each parameter multiplied by the coefficient corresponding to that parameter, the linear programming module further operable to select the coefficients so that the estimated power consumption approximates the average power consumption for a majority of both the first plurality of timing windows and the second plurality of timing windows.

15. The device of claim 13, wherein the estimated power consumption approximates the average power consumption when the difference between the estimated power consumption and the average power consumption is less than a constant.

16. The device of claim 13, further comprising a host processor operable to identify a software program; wherein:
the timing windows are a first plurality of timing windows;
the parameter extractor is further operable to, for each of a second plurality of timing windows, determine a value for each parameter from a high-level simulation of the software program; and
the host processor is further operable to, for each of the second plurality of timing windows, determine an estimated power consumption of the software program equal to a summation of the value of each parameter multiplied by the coefficient corresponding to that parameter.

17. The device of claim 13, wherein the training program represents an application domain.

18. The device of claim 13, wherein:
for each of the timing windows, a power estimation error is equal to the difference between the estimated power consumption and the average power consumption; and
the estimated power consumption approximates the average power consumption when an error value is minimized, wherein the error value is equal to one selected from:

a maximum power estimation error, wherein the maximum power estimation error is equal to largest power estimation error for all timing windows;

an average power estimation error, wherein the average power estimation error is equal to average of the power estimation error for each timing window; and a weighted sum of the maximum power estimation error and the average power estimation error.

19. The device of claim 13, wherein the low-level simulation is a gate-level simulation and the high-level simulation is an instruction-set simulation.

20. The device of claim 13, wherein the parameters include at least one selected from:

the number of instruction cache misses; the number of data cache misses; the number of untaken branch instructions predicted as untaken branch; the number of taken branch instructions predicted as taken branch; the number of taken branch instructions predicted as untaken branch; the number of untaken branch instructions predicted as taken branch; the number of branch instructions which use a link register; the number of branch instructions which always jump to an absolute address; the number of load instructions executed; the number of store instructions executed; the number of load instructions which cause a data cache miss; the number of store instructions which cause a data cache miss; the number of instructions which move data from general purpose register to off-chip memory; the number of instructions which move data from off-chip memory to general purpose register; the number of instruction cache accesses; the number of data cache accesses; the number of taken branch instructions predicted as taken branch, which is located at the end of a cache line; the number of untaken branch instructions predicted as taken branch, which is located at the end of a cache line; the number of pairs of two consecutive load instructions which access the same cache line, where the first instruction results in a cache miss; the number of pairs of two consecutive load instructions which access the same cache line, where the first instruction results in a cache hit; the number of pairs of two consecutive store instructions which do access the same cache line; the number of pairs of two consecutive store instructions which do not access the same cache line; and the number of instructions using way-1 and way-2 of the 2-way VLIW processor.

21. Logic for characterizing a processor design, the logic encoded in media and operable when executed to:

identify a training program;

establish a plurality of timing windows from a low-level simulation of a processor executing the training program, each of the plurality of timing windows corresponding to a particular number of processor cycles;

determine an average power consumption for each of the plurality of timing windows;

identify one or more parameters;

for each of the timing windows, determine a value for each parameter from a high-level simulation of the training program;

for each of the timing windows, determine an estimated power consumption equal to a summation of the value of each parameter multiplied by a coefficient corresponding to that parameter; and select the coefficients so that the estimated power consumption approximates the average power consumption for a majority of the timing windows.

22. The logic of claim 21, wherein:

the training program is a first training program; and the timing windows are a first plurality of timing windows;

the logic further operable to:

identify a second training program;

determine an average power consumption for each of a second plurality of timing windows from a low-level simulation of the processor executing the second training program;

for each of the second plurality of timing windows, determine a value for each parameter from a high-level simulation of the second training program;

for each of the second plurality of timing windows, determine an estimated power consumption equal to a summation of the value of each parameter multiplied by the coefficient corresponding to that parameter; and select the coefficients so that the estimated power consumption approximates the average power consumption for a majority of both the first plurality of timing windows and the second plurality of timing windows.

23. The logic of claim 21, wherein the estimated power consumption approximates the average power consumption when the difference between the estimated power consumption and the average power consumption is less than a constant.

24. The logic of claim 21, wherein the timing windows are a first plurality of timing windows, the logic further operable to:

identify a software program;

for each of a second plurality of timing windows, determine a value for each parameter from a high-level simulation of the software program; and for each of the second plurality of timing windows, determine an estimated power consumption of the software program equal to a summation of the value of each parameter multiplied by the coefficient corresponding to that parameter.

25. The logic of claim 21, wherein the training program represents an application domain.

26. The logic of claim 21, wherein:

for each of the timing windows, a power estimation error is equal to the difference between the estimated power consumption and the average power consumption; and the estimated power consumption approximates the average power consumption when an error value is minimized, wherein the error value is equal to one selected from:

a maximum power estimation error, wherein the maximum power estimation error is equal to largest power estimation error for all timing windows;

an average power estimation error, wherein the average power estimation error is equal to average of the power estimation error for each timing window; and a weighted sum of the maximum power estimation error and the average power estimation error.

27. The logic of claim 21, wherein the low-level simulation is a gate-level simulation and the high-level simulation is an instruction-set simulation.

28. The logic of claim 21, wherein the parameters include at least one selected from:

the number of instruction cache misses; the number of data cache misses; the number of untaken branch instructions predicted as untaken branch; the number of taken branch instructions predicted as taken branch; the number of taken branch instructions predicted as untaken branch; the number of untaken branch instructions predicted as taken branch; the number of branch instructions which use a link register; the number of branch instructions which always jump to an absolute address; the number of load instructions executed; the number of store instructions executed; the number of load instructions which cause a data cache miss; the number of store instructions which cause a data cache miss; the number of instructions which move data from general purpose register to off-chip memory; the number of instructions which move data from off-chip memory to general purpose register; the number of instruction cache accesses; the number of data cache accesses; the number of taken branch instructions predicted as taken branch, which is located at the end of a cache line; the number of untaken branch instructions predicted as taken branch, which is located at the end of a cache line; the number of pairs of two consecutive load instructions which access the same cache line, where the first instruction results in a cache miss; the number of pairs of two consecutive load instructions which access the same cache line, where the first instruction results in a cache hit; the number of pairs of two consecutive store instructions which do access the same cache line; the number of pairs of two consecutive store instructions which do not access the same cache line; and the number of instructions using way-1 and way-2 of the 2-way VLIW processor.

29. A system for characterizing a processor design comprising:

means for identifying a training program;

means for establishing a plurality of timing windows from a low-level simulation of a processor executing the training program, each of the plurality of timing windows corresponding to a particular number of processor cycles;

means for determining an average power consumption for each of the plurality of timing windows;

means for identifying one or more parameters;

means for determining, for each of the timing windows, a value for each parameter from a high-level simulation of the training program;

means for determining, for each of the timing windows, an estimated power consumption equal to a summation of the value of each parameter multiplied by a coefficient corresponding to that parameter; and means for selecting the coefficients so that the estimated power consumption approximates the average power consumption for a majority of the timing windows.

* * * * *